Patented Oct. 2, 1928.

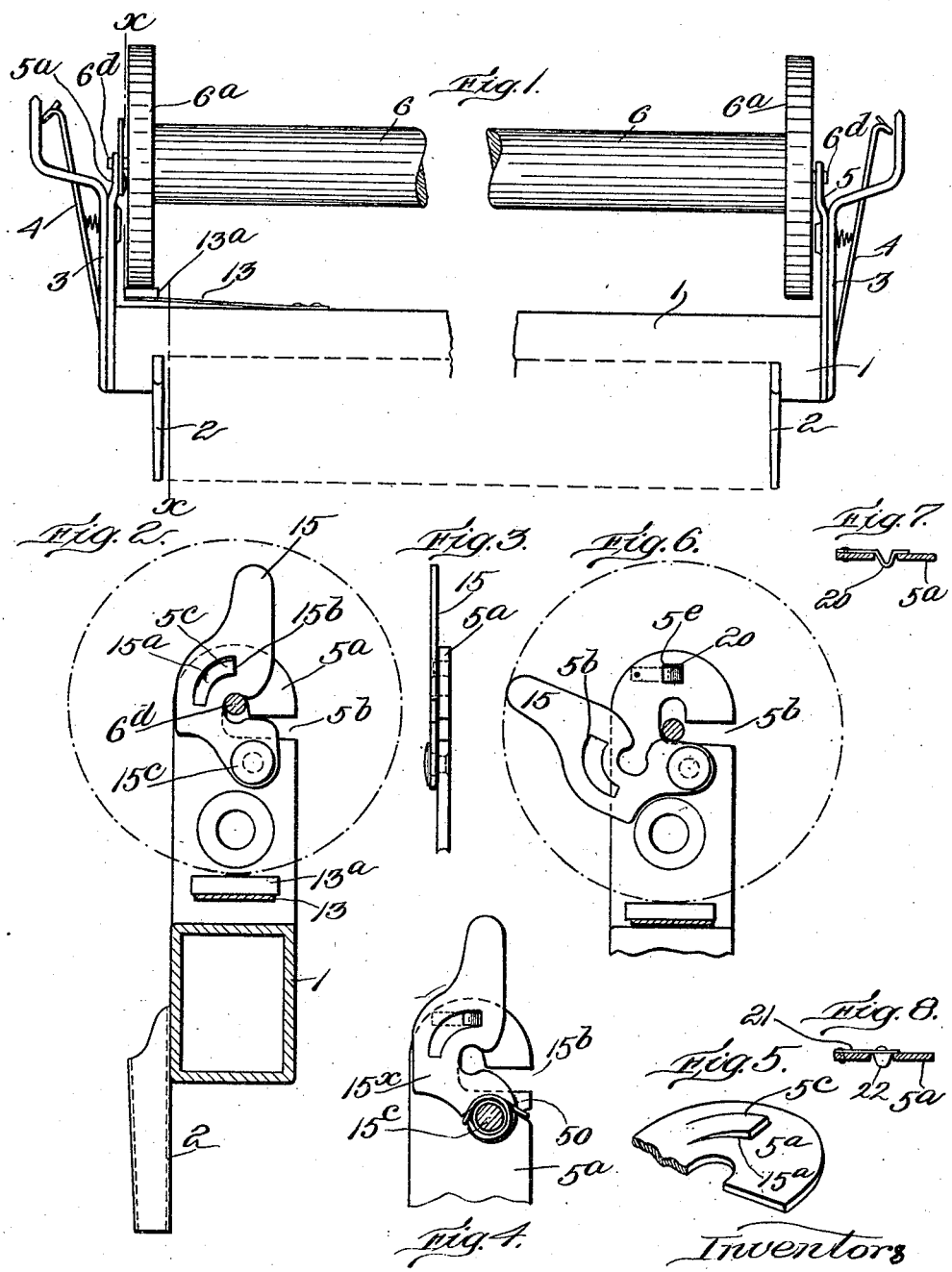

1,686,489

UNITED STATES PATENT OFFICE.

EDGAR F. HATHAWAY, OF WELLESLEY, AND WALTER BIXBY, OF BOSTON, MASSACHUSETTS, ASSIGNORS TO SHAWMUT ENGINEERING COMPANY, OF BOSTON, MASSACHUSETTS, A CORPORATION OF MASSACHUSETTS.

YARN-SPOOL BEARING.

Application filed October 5, 1923. Serial No. 666,829.

This invention is concerned with the problem of mounting the yarn-spool of a tube frame in such a manner as to facilitate the insertion and removal of the yarn-spool in a quick and convenient manner, while making provision for normally retaining it against displacement from its supporting bearings.

To this end the invention comprises, generally speaking, in combination with a rotatable yarn-spool, supporting bearing brackets one of which is formed with a slotted or open bearing for the spool journal and carries a pivotal latch or keeper mounted to move into position to prevent egress of the spool journal through the open slot of its bearing, said latch being held releasably in such closed position by a suitable self-acting detent mounted on the bearing bracket. This and other novel features of the invention will be pointed out in the following specification and will be defined in the claims hereto annexed.

In the accompanying drawings we have illustrated a construction and arrangement embodying the principles of this invention, in which:

Figure 1 is a front elevation showing the yarn-spool mounted in a well known type of tube frame.

Figure 2 is an elevation showing the inside face of the slotted bearing bracket with the carrier bar of the tube frame in cross section.

Figure 3 is an enlarged edgewise view of the upper portion of the bearing bracket and its connected latch.

Figure 4 is an inside elevation of the upper part of the bearing bracket and latch, showing an actuating spring applied to close the latch.

Figure 5 is a perspective view showing the spring detent construction at the upper portion of the bearing bracket.

Figure 6 is a modified view showing the spring detent made and applied as a separate member.

Figure 7 is a horizontal section of the upper end of the bearing bracket showing the detent.

Figure 8 is a similar view showing a modified form of detent.

In the drawings I have shown a practically complete tube frame of well known type comprising the usual longitudinal carrier bar 1, to the front of which the tuft guiding tubes are secured in any suitable manner, the carrier bar being suspended from an overhead carrier chain by means of suspension hangers of any suitable type, in this case embracing an angularly offset main arm 3, secured rigidly to the carrier bar and the movable hook arm 4 spring-pressed outwardly toward an interposed chain. From the main suspension arm 3, projects upwardly the spool-supporting bracket 5, bored to receive one journal of the spool, while at the other end a similar bearing bracket $5^a$, projects from the suspension arm, but in this case the bearing bracket $5^a$, is formed with an L shaped bearing slot or recess $5^b$, to permit the insertion of the yarn-spool journal $6^d$, through the side edge of the bearing bracket.

The usual brake spring 13, carrying a brake pad $13^a$, engaging the periphery of one of the heads $6^a$, performs the usual function of retarding the spool in order to maintain tension on the yarn and spool through the tuft tubes by its upward pressure. It will be obvious that the upward pressure of the brake element tends to keep the journal pushed up into the vertical or highest portion of the slotted bearing aperture, and the present invention is particularly concerned with preventing the accidental egress or escape of the spool journal of this open bearing.

For the purpose of insuring the maintenance of the spool journal bearing in the open slot, we provide a latch 15 which, in the form shown, is pivotally mounted upon a pivot stud $15^c$, and is shaped so that when swung into vertical or bearing-closing position, a portion of the latch serves to obstruct or close the open exit slot of the bearing and thereby prevent the removal of the journal.

As the tube frame, in the course of its travel along the carrier chain, is turned upside down and at all angles, provision is made for releasably locking the latch in its closed or operative position.

The construction employed for this purpose comprises, in the forms shown in Figures 1 to 3, a spring tongue or dentent $5^c$, struck up integrally out of sheet steel of the bracket 5ª, so as to normally lie with its free or severed end projecting inwardly beyond the plane of the inside face of the bearing bracket 5ª. The latch is cut away as shown at 15ª, to leave a shoulder or edge at 15ᵇ in position, when the latch is in closed position, to abut against the end of the spring detent or tongue so as to prevent reverse or opening movement of the latch. By pressing the spring tongue 5ᶜ, inward to lie flush with the slot from which it is protruded, it is possible to readily swing back the latch to open position.

In Figures 6 and 7 I have shown a slightly modified form of the detent in which case a suitable aperture is cut through the bearing bracket 5ª, as shown at 5ᵉ, and a separate spring detent 20 is riveted to the adjacent portion of the bearing bracket with its operative portion bowed sufficiently to project through the aperture 5ᵉ and engage the shoulder 15ᵇ, to prevent opening of the latch. It will be seen that the free end of the bowed end of the spring 20, is carried back through the aperture 5ᵉ, to overlap the adjacent edge of the aperture, thereby limiting the outward movement of said spring. The slope of the bowed spring is such that it will yield to the pressure of the latch 15 when the latter is moved in either direction and, therefore, this form of detent is not positive like the forms shown in Figures 2 and 5, but on the other hand requires no manipulation being wholly automatic or self-acting both as to forming locking engagement with the latch and as to its release therefrom.

The form of latch shown in Figure 8 operates on the same principle. In this case a straight leaf spring 21, is employed and a suitably shaped convex boss 22, is riveted or otherwise secured thereto to form an engagement with the pivotal latch 15.

I have shown in Figure 4 a latch-closing spring 50 of the torsion type coiled around the latch pivot 15ᶜ, with its ends engaging notches in the bearing bracket 5ª, and in the latch 15ˣ, respectively, to normally actuate the latch to closed position so that the spool journal may be inserted merely by pressing the journal against the latch from the open or slotted side, the spring 50, acting to close the latch again as soon as the journal has been passed into the upper portion of the slotted bearing. This form of latch is practically safe against permitting the accidental release of the spool journal in view of the fact that the brake spring tends to keep the journal in the upper portion of the bearing so that accidental pressure, tending to open the latch, does not necessarily release the journal, and as soon as the accidental pressure is relieved or ceases the latch automatically restores itself to operative position. In this case, however, if any additional detent be used it would be a non-positive of the type illustrated in Figures 7 and 8.

While the latch 15ˣ, shown in Figure 4, is easily released by pressure of the finger directly against the latch without other manipulation of the detent, it will be seen that its actuating spring 50 tends to return it to locking or bearing-closing position automatically. While this latch yields to the pressure of the journal being inserted into the bearing it will be observed that no pressure of the journal against the latch tends to open the latch since the vertical wall of the bearing slot 5ᵇ, opposite the exit opening, positively resists any pressure of the journal in the direction that would tend to open the latch. So far as any pressure of the journal therefore is concerned, the journal acts only to open the latch when it is being inserted and after insertion, the journal, so far as any pressure of its own is concerned, is positively held against removal while the latch is very conveniently and easily opened by lateral pressure thereon to cause it to spring out of line with the detent to permit removal of the spool. This is an entirely novel arrangement of this class of device and has obvious advantages quite independently of the use of the detent 20.

It will be seen that the journal can not escape by any pressure outwardly whether or not the latch be closed, and that to escape from its bearing it must move inwardly toward the pivotal center of the latch where it meets the obstruction of the journal retaining or confining portion of the latch which is interposed between the closed end of the bearing slot and said pivotal center. One advantage of this arrangement is that if the latch be thrown back by the operator there is no danger of the spool falling out even if the tube frame be in its inverted position because the spool must move inwardly against the pressure of the spool-brake before it can escape.

What we claim is:

1. A bearing bracket for a yarn spool embracing in combination, a bracket provided with an open slot bearing to permit passage of the spool journal thereinto, a latch fulcrumed on the bracket to move into position to prevent removal of the journal and formed to press the journal into the closed end of the bearing slot as it moves to closed position, said bracket being formed with a partly severed portion forming a projecting spring tongue arranged to releasably retain the latch in position to positively retain the journal from being pressed out of the bearing, substantially as described.

2. A spool-bearing bracket for a tube frame embracing an arm formed with a laterally opened outwardly closed bearing slot arranged to receive and sustain outward lateral pressure of an inserted spool-journal, a pivotal latch arranged to swing into operative position to close the laterally opened end of the slot against escape of the spool-journal, a yielding detent carried by said arm and located to form a stop to prevent the accidental opening of the latch, the latch being displaceable by sidewise pressure to enable it to clear the detent when being opened by the operator.

3. A spool-bearing bracket for a tube-frame embracing in combination a spool-bearing arm formed with an open bearing slot whose closed end is disposed to resist outward lateral thrust of the spool, a self-closing latch pivotally mounted on said arm to swing transversely of the spool axis to close the bearing slot against escape of the journal and self-acting means for locking the latch against accidental opening while allowing the latch to be swung open when sprung laterally out of engagement with its locking means.

4. A spool-bearing bracket for a tube frame embracing in combination a bearing arm provided with an open slot-bearing for rotatably supporting a spool journal, a latch pivotally mounted on said arm to interpose a journal-retaining portion between the closed end of the slot and the pivotal center of the latch.

5. A spool-bearing bracket for a tube-frame embracing in combination a bearing arm provided with an open slot bearing for rotatably supporting a spool-journal, a latch pivotally mounted on said arm to interpose a journal retaining portion between the closed end of the slot and the pivotal center of the latch, and self-acting means for engaging said latch when the latch is moved to closed position and prevent the latch from accidental movement away from its closed position.

In witness whereof, we have subscribed the above specification.

EDGAR F. HATHAWAY.
WALTER BIXBY.